(12) United States Patent
Jeon

(10) Patent No.: US 10,377,249 B2
(45) Date of Patent: Aug. 13, 2019

(54) VEHICLE POWER CONTROL DEVICE AND METHOD

(71) Applicant: MANDO CORPORATION, Gyeonggi-do (KR)

(72) Inventor: Joon Young Jeon, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 236 days.

(21) Appl. No.: 15/478,137

(22) Filed: Apr. 3, 2017

(65) Prior Publication Data

US 2017/0282728 A1      Oct. 5, 2017

(30) Foreign Application Priority Data

Apr. 5, 2016    (KR) .......................... 10-2016-0041652

(51) Int. Cl.
*H02M 3/04*       (2006.01)
*B60L 53/20*     (2019.01)
(Continued)

(52) U.S. Cl.
CPC ............. *B60L 11/1811* (2013.01); *B60K 6/28* (2013.01); *B60L 53/20* (2019.02); *H02J 9/061* (2013.01);
(Continued)

(58) Field of Classification Search
CPC .... B60K 6/28; B60L 11/1811; B60L 2210/12; B60L 2210/14; H02J 9/061; H02M 3/04;
(Continued)

(56) References Cited

U.S. PATENT DOCUMENTS

| 2007/0152627 | A1* | 7/2007 | Shen | ..................... H02J 7/0063 |
| | | | | 320/107 |
| 2008/0157597 | A1* | 7/2008 | Pratt | ........................ H02J 1/08 |
| | | | | 307/31 |

(Continued)

FOREIGN PATENT DOCUMENTS

| CN | 101674016 | 3/2010 |
| CN | 101794992 | 8/2010 |

(Continued)

OTHER PUBLICATIONS

Office Action dated Dec. 11, 2018 for Chinese Patent Application No. 201710216440.4 and its English translation by Google Translate.

*Primary Examiner* — Jared Fureman
*Assistant Examiner* — Esayas G Yeshaw
(74) *Attorney, Agent, or Firm* — Ladas & Parry, LLP

(57) ABSTRACT

The present invention relates to a vehicle power control device and method capable of reducing a size and manufacturing cost of a circuit. The vehicle power control device according to an embodiment of the present invention includes a closed loop buck-boost converter supplied with power from a power source and outputting the power to a load a plurality of open loop converters connected to the closed loop buck-boost converter in parallel and supplied with the power from the power source and outputting the power to the load and a controller controlling an operation of the closed loop buck-boost converter and an operation of the plurality of open loop converter, respectively, depending on power capacity required for the load.

19 Claims, 8 Drawing Sheets

(51) Int. Cl.
*B60K 6/28* (2007.10)
*B60L 11/18* (2006.01)
*H02J 9/06* (2006.01)
*H02M 3/158* (2006.01)

(52) U.S. Cl.
CPC ........... *H02M 3/04* (2013.01); *H02M 3/1584* (2013.01); *B60L 2210/12* (2013.01); *B60L 2210/14* (2013.01); *Y02T 10/7005* (2013.01); *Y02T 10/7072* (2013.01); *Y02T 10/7225* (2013.01); *Y02T 10/7233* (2013.01); *Y02T 90/127* (2013.01); *Y02T 90/14* (2013.01)

(58) Field of Classification Search
CPC .............. H02M 3/1584; Y02T 10/7233; Y02T 10/7225; Y02T 10/7072; Y02T 90/14; Y02T 90/127; Y02T 10/7005
See application file for complete search history.

(56) References Cited

U.S. PATENT DOCUMENTS

| | | | |
|---|---|---|---|
| 2011/0140665 A1* | 6/2011 | Tamezane | H02J 7/0016 320/118 |
| 2013/0003431 A1* | 1/2013 | Reddy | H02M 1/4216 363/126 |
| 2014/0035548 A1* | 2/2014 | Oaklander | H03K 17/063 323/283 |
| 2015/0280487 A1* | 10/2015 | Nakazawa | H01M 10/44 320/101 |
| 2017/0070150 A1* | 3/2017 | Kim | H02M 1/42 |

FOREIGN PATENT DOCUMENTS

| | | |
|---|---|---|
| CN | 102055335 | 5/2011 |
| CN | 104956581 | 9/2015 |
| CN | 106160469 | 11/2016 |
| KR | 10-1387829 | 4/2014 |

* cited by examiner

[Fig. 1]
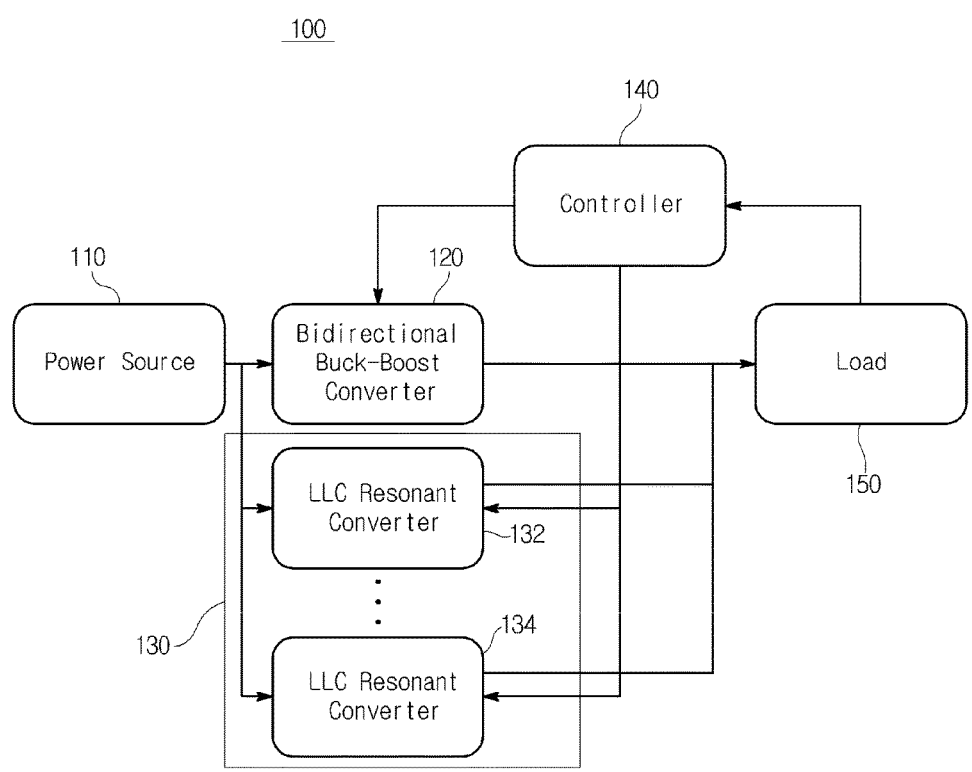

[Fig. 2]
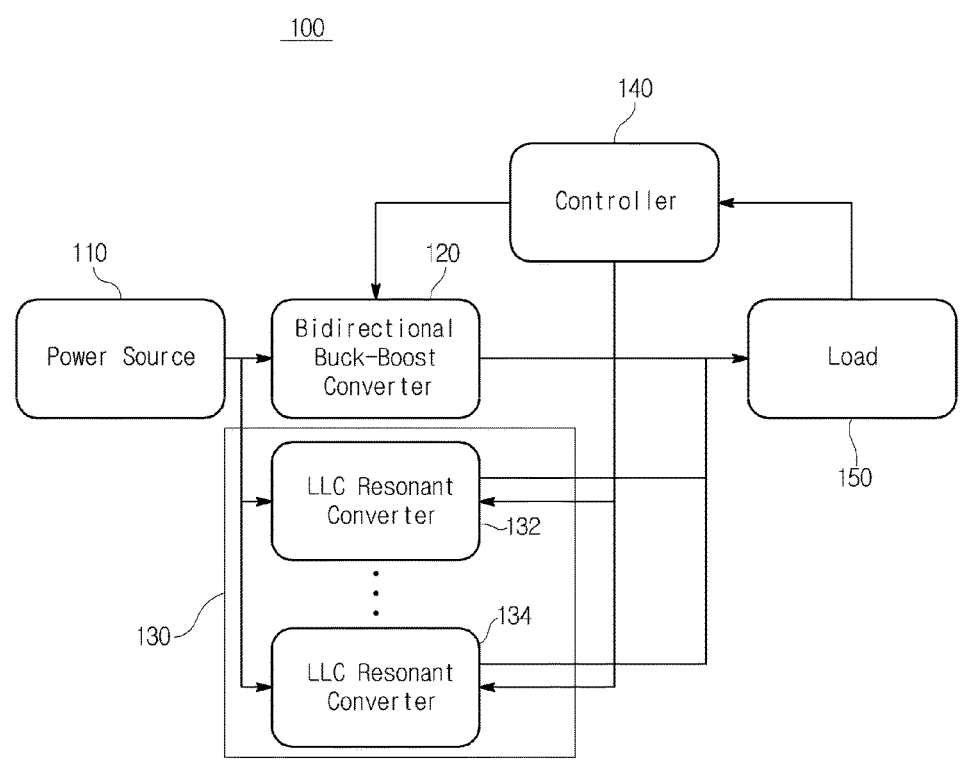

[Fig. 3]
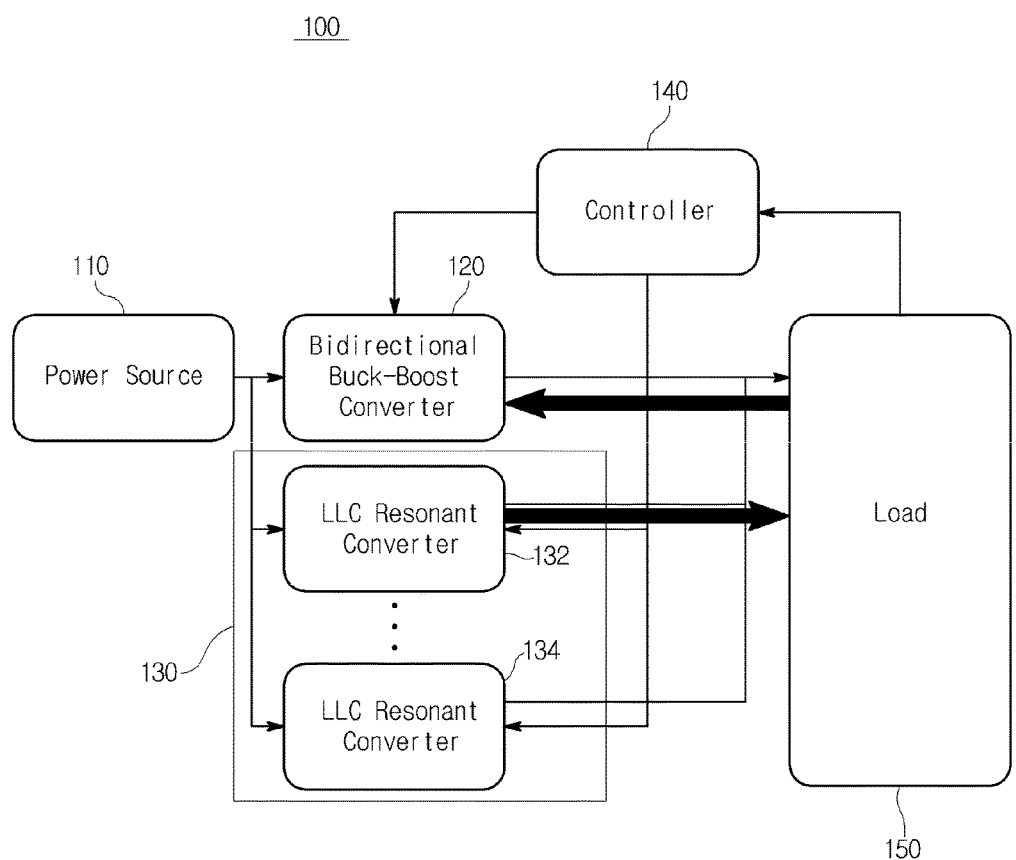

[Fig. 4]
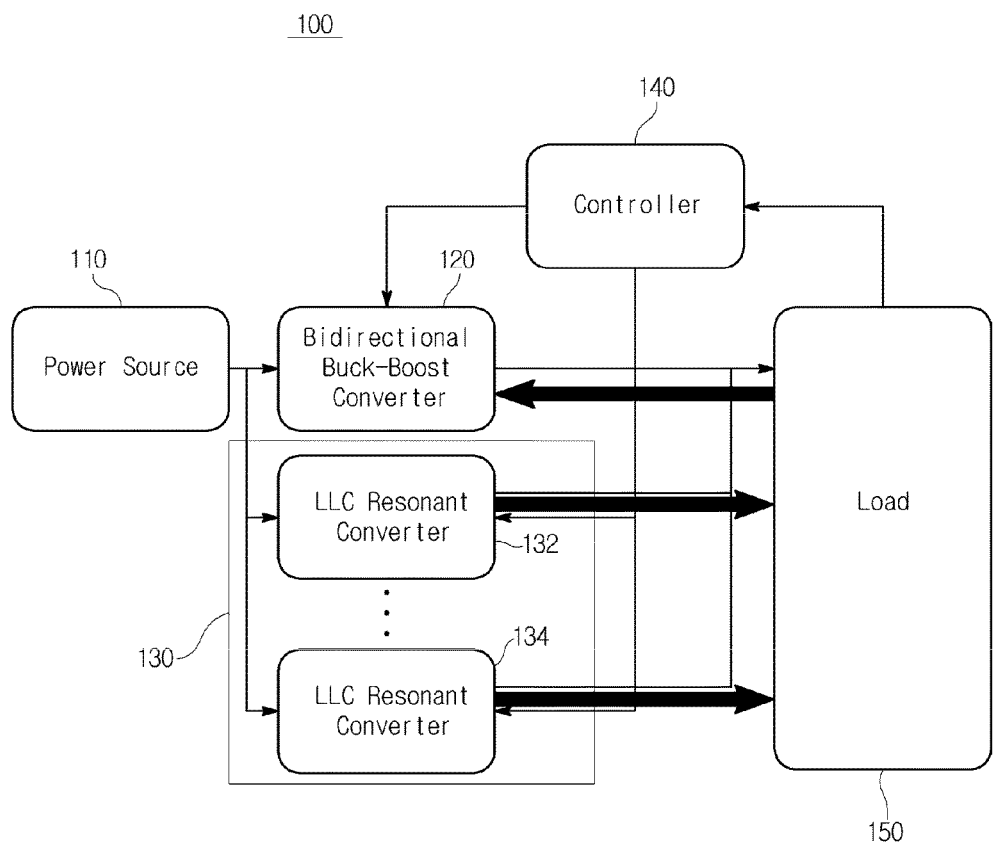

[Fig. 5]
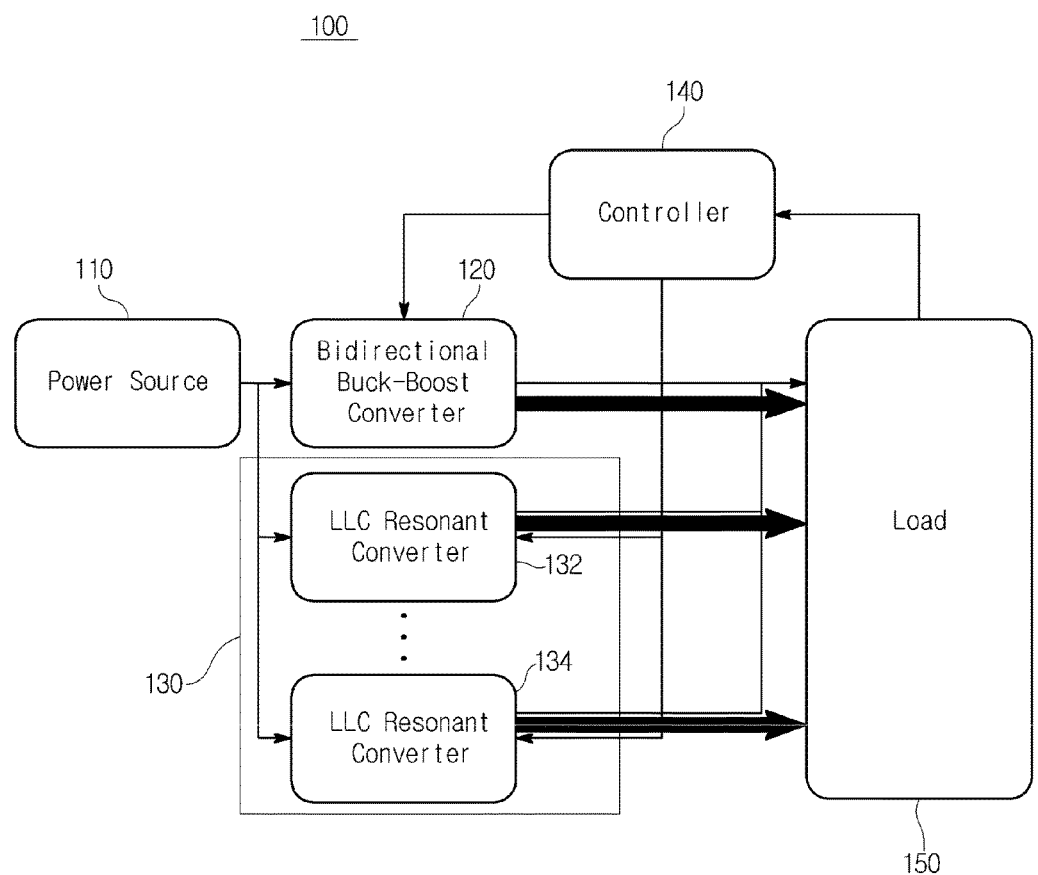

[Fig. 6]
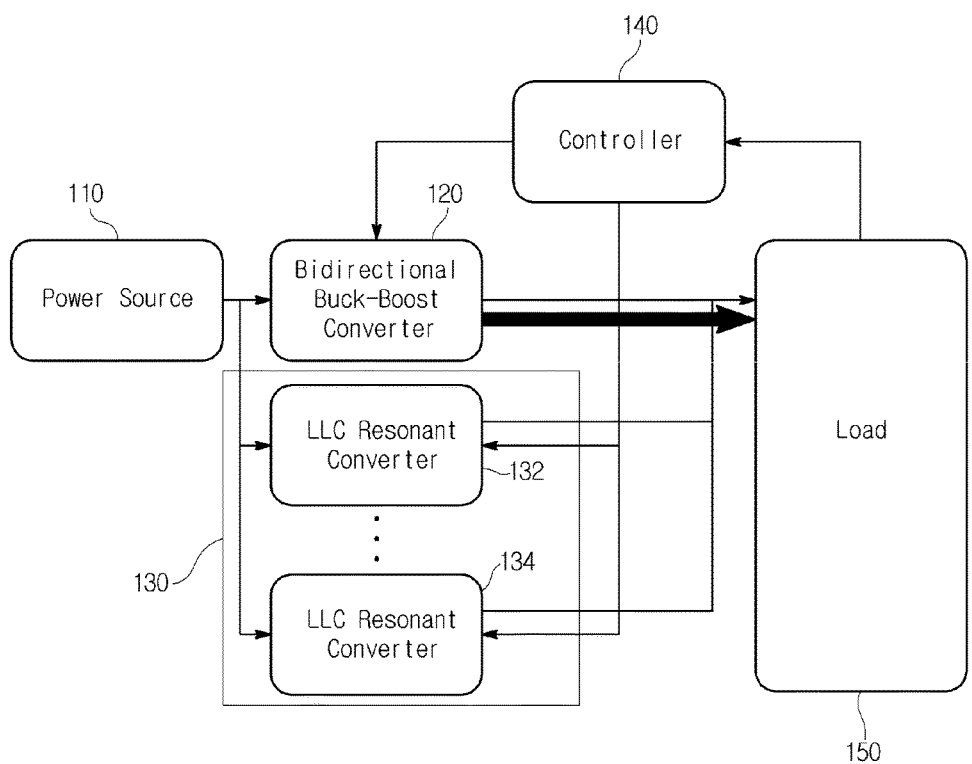

[Fig. 7]
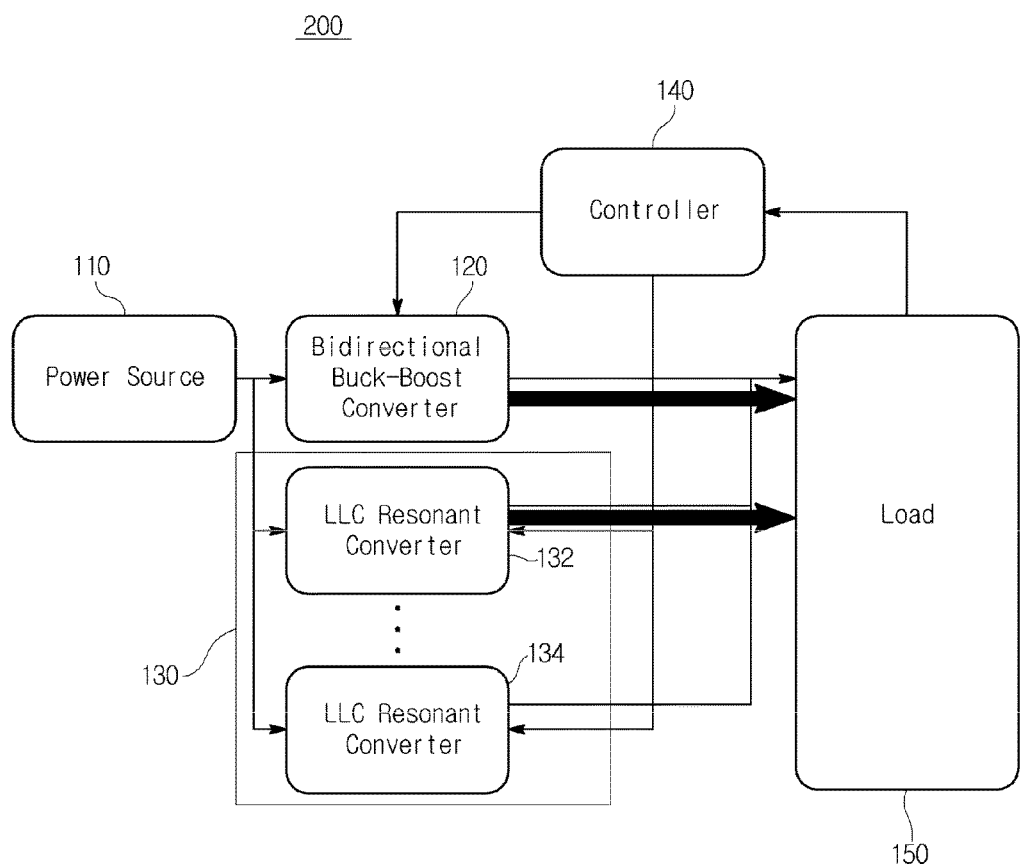

[Fig. 8]
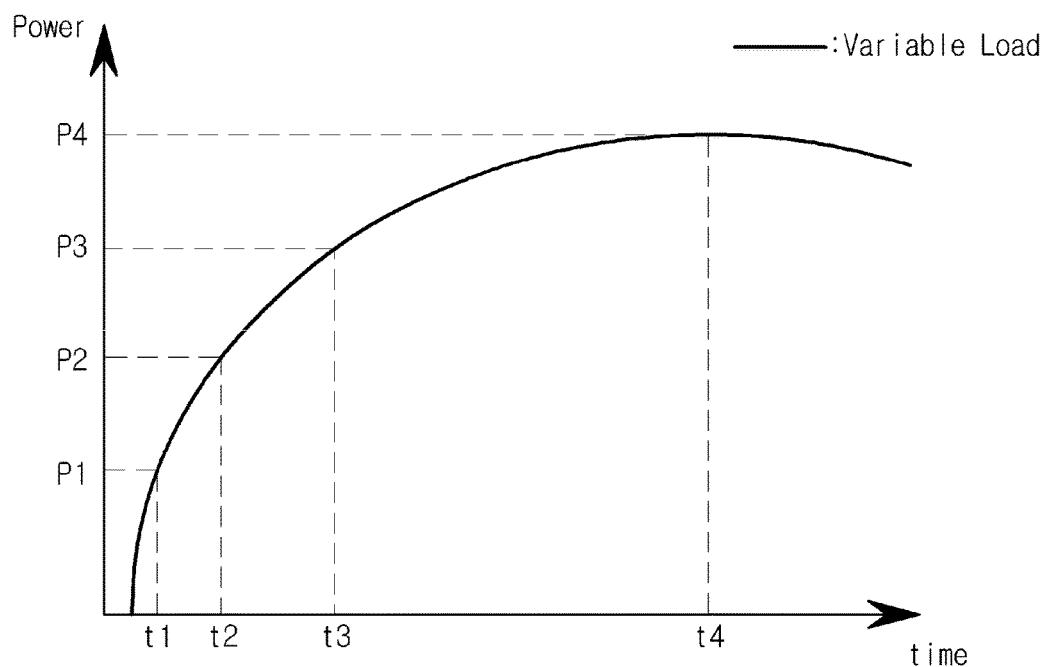

VEHICLE POWER CONTROL DEVICE AND METHOD

CROSS-REFERENCE TO RELATED APPLICATION(S)

This application claims priority to Korean Patent Application No. 10-2016-0041652, filed on Apr. 5, 2016, the disclosure of which is incorporated herein by reference in its entirety.

BACKGROUND OF THE INVENTION

Field of the Invention

Exemplary embodiments of the present invention relate to a vehicle power control device and method, and more particularly, to a vehicle power control device and method capable of reducing a size and manufacturing cost of a circuit.

Description of the Related Art

In recent years, a bidirectional DC-DC converter have been used in various fields such as a battery charging and discharging system for vehicles, an uninterruptible power supply system (UPS), and a hybrid electric vehicle (HEV). Conventionally, a voltage source converter or a current source converter using an isolated high frequency transformer has been developed and applied to the bidirectional DC-DC converter.

The existing bidirectional DC-DC converter basically performs hard switching, and therefore has a limitation in increasing a switching frequency for reducing a power conversion loss due to a switching loss and increasing integration. Accordingly, a bidirectional DC-DC converter incorporated with a soft-switchable LLC resonant converter for increasing integration and reducing a switching loss and EMI has been actively developed.

According to the related art, when a power converter for DC-DC conversion is used, non-isolated converters are connected in parallel. This is to find an optimum point of efficiency due to a parallel operation and to reduce a size of a device by using an interleaving control technique, or the like. In addition, even if a failure occurs in one phase of a system due to the parallel operation, the system may be operated by the remaining converters, and therefore stability of the system may be improved.

A DC-DC converter having a general parallel structure have a structure in which two non-resonant power paths are connected in parallel. However, in this case, since the two non-resonant converters are connected in parallel, the size of the system may not be reduced in proportion to the reduction of the switching loss that is an advantage of the resonant converter. On one hand, it may be determined that the size of the system may be reduced by connecting the resonant converters in parallel, but there are the following problems when only the resonant converters are connected in parallel.

The resonant converter has a small range of output voltage and therefore is often driven by an open loop PWM scheme. However, when the resonant converter is used, it may not be controlled by the open loop PWM scheme and therefore may not be applied to a power system requiring a PWM control. That is, if the non-resonant converters are connected in parallel, the power system may be controlled but the size of the power system may be increased. On the other hand, if the resonant converters are connected in parallel, the size of the power system becomes small, but the operation control cannot be performed.

RELATED ART DOCUMENT

Patent Document (Patent Document 1) Korean Patent No. 10-1387829 (Apr. 25, 2014)

SUMMARY OF THE INVENTION

An object of the present invention is to provide a vehicle power control device and method capable of reducing a size and manufacturing cost of a circuit.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a vehicle power control device includes a closed loop buck-boost converter supplied with power from a power source and outputting the power to a load at least one open loop converter connected to the closed loop buck-boost converter in parallel and supplied with the power from the power source and outputting the power to the load and a controller controlling an operation of the closed loop buck-boost converter and an operation of the at least one open loop converter, respectively, depending on power capacity required for the load, in which the controller controls the closed loop buck-boost converter to be maintained in an operating state.

The controller may determine output capacity of the closed loop buck-boost converter and operate the open loop converter if the output capacity of the closed loop buck-boost converter is smaller than the power capacity required for the load.

The controller may control the closed loop buck-boost converter so that the closed loop buck-boost converter outputs power as much as a constant output of the open loop converter is smaller than that required for the load.

If the power capacity required for the load is greater than a sum of an output of the closed loop buck-boost converter and a constant output of the open loop converter, the controller may additionally operate the at least one open loop converter.

The controller may operate the closed loop buck-boost converter and the at least one open loop converter and control the output of the closed loop buck-boost converter as much as the output capacity of the at least one open loop converter is smaller than the power capacity required for the load.

The controller may operate the closed loop buck-boost converter and the at least one open loop converter and operate the closed loop buck-boost converter in a boost mode if the output capacity of the at least one open loop converter is greater than the power capacity required for the load.

In accordance with another aspect of the present invention, a vehicle power control device includes: a closed loop buck-boost converter supplied with power from a power source and outputting the power to a load; at least one open loop converter connected to the closed loop buck-boost converter in parallel and supplied with the power from the power source and outputting the power to the load; and a controller controlling an operation of the closed loop buck-boost converter and an operation of the at least one open loop converter, respectively, depending on power capacity required for the load, in which the controller controls the at least one open loop converter to be maintained in an operating state.

The controller may determine output capacity of the at least one open loop converter and operate the closed loop buck-boost converter in a buck mode if the output capacity of the at least one open loop converter is smaller than the power capacity required for the load.

The controller may determine output capacity of the closed loop buck-boost converter and the output capacity of the at least one open loop converter and additionally operate the open loop converter if a sum of the output capacity of the closed loop buck-boost converter and the output capacity of the at least one open loop converter is smaller than the power capacity required for the load.

The controller may determine the output capacity of the plurality of open loop converters and operate the closed loop buck-boost converter in the buck mode if the output capacity of the plurality of open loop converters is smaller than the capacity required for the load.

The controller may determine the output capacity of the plurality of open loop converters and operate the closed loop buck-boost converter in a boost mode if the output capacity of the plurality of open loop converters exceeds the capacity required for the load.

The closed loop buck-boost converter may be operated in the boost mode to charge the power source with power remaining after consumed by the load.

In accordance with another aspect of the present invention, a vehicle power control device includes: a closed loop buck-boost converter supplied with power from a power source and outputting the power to a load; at least one open loop converter connected to the closed loop buck-boost converter in parallel and supplied with the power from the power source and outputting the power to the load; and a controller controlling an operation of the closed loop buck-boost converter and an operation of the at least one open loop converter, respectively, depending on power capacity required for the load.

The controller may determine output capacity of the closed loop buck-boost converter and the plurality of open loop converters and operate the closed loop buck-boost converter in a buck mode if the output capacity is smaller than the power capacity required for the load.

The controller may determine output capacity of the closed loop buck-boost converter and the plurality of open loop converters and additionally operate one or a plurality of open loop converters in addition to the open loop buck-boost converter that is operating, if the output capacity is smaller than the power capacity required for the load.

The controller may determine output capacity of the closed loop buck-boost converter and the plurality of open loop converters and operate the closed loop buck-boost converter in a boost mode if the output capacity exceeds the power capacity required for the load.

The closed loop buck-boost converter may charge the power source with power remaining after consumed by the load.

A bidirectional buck-boost converter may be applied as the closed loop buck-boost converter.

An LLC resonant converter may be applied as the open loop converter.

The vehicle power control device and method according to the embodiment of the present invention may have a limitation in reducing the size due to the non-resonant structure but may perform the voltage control using the bidirectional buck-boost converter with the simple voltage control. Further, the vehicle power control device and method uses the LLC resonant converter that may be reduced in size due to the resonant structure but has a difficulty in technically performing the voltage control, thereby increasing the electric capacity. As described above, it is possible to reduce the size and manufacturing cost of the power control system compared to capacity by connecting the buck-boost converter and the plurality of LLC resonant converters in parallel.

The vehicle power control device and method according to the embodiment of the present invention may maintain the rated output by driving one bidirectional buck-boost and one LLC resonant converter but when the power capacity required for loads is insufficient, may maintain the rated output by additionally driving one or a plurality of LCC resonant converters.

The vehicle power control device and method according to the embodiment of the present invention may absorb the exceeding power capacity by operating the bidirectional buck-boost converter in the boost mode if the output capacity of the plurality of LLC resonant converters exceeds the output capacity required for loads at the time of driving the plurality of LLC resonant converters, thereby maintaining the rated output.

The vehicle power control device and method according to the embodiment of the present invention may maintain the rated output by operating the bidirectional buck-boost converter in the buck mode if the output capacity of the plurality of LLC resonant converters is smaller than that required for loads at the time of driving the plurality of LLC resonant converters.

In addition, other features and advantages of the present invention may be newly understood through the embodiments of the present invention.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating a vehicle power control device according to an embodiment of the present invention;

FIG. 2 is a view illustrating a parallel connection structure of a bidirectional buck-boost converter and an LLC resonant converter illustrated in FIG. 1;

FIG. 3 is a view illustrating a vehicle power control method according to an embodiment of the present invention, which illustrates a power control method for driving one LLC resonant converter before output capacity reaches an operating point;

FIG. 4 is a view illustrating a vehicle power control method according to an embodiment of the present invention, which illustrates a power control method for driving a plurality of LLC resonant converters before the output capacity reaches the operating point;

FIG. 5 is a view illustrating a vehicle power control method according to an embodiment of the present invention, which illustrates a power control method upon an overload operation after the output capacity reaches the operating point;

FIG. 6 is a view illustrating a vehicle power control method according to another embodiment of the present invention, which illustrates a power control method for driving only a bidirectional buck-boost converter before output capacity reaches an operating point;

FIG. 7 is a view illustrating a vehicle power control method according to an embodiment of the present invention, which illustrates a power control method for driving a bidirectional buck-boost converter and at least one LLC resonant converter; and FIG. 8 is a graph for explaining a method for controlling a vehicle power control device in each interval depending on power capacity required for a variable load.

DESCRIPTION OF SPECIFIC EMBODIMENTS

Hereinafter, exemplary embodiments of the present invention will be described in detail with reference to the accompanying drawings so that those skilled in the art may easily practice the present invention. As those skilled in the art would realize, the described embodiments may be modified in various different ways, all without departing from the spirit or scope of the present invention.

A part irrelevant to the description will be omitted to clearly describe the present invention, and the same elements will be designated by the same reference numerals throughout the specification.

In addition, throughout the present specification, when any one part is referred to as being "connected to" another part, it means that any one part and another part are "directly connected to" each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, zones, layers, and/or sections but are not limited thereto. These terms are used only to differentiate any portion, component, zone, layer, or section from other portions, components, zones, layers, or sections. Therefore, a first portion, component, zone, layer, or section which will be described below may be mentioned as a second portion, component, zone, layer, or section without departing from the scope of the present invention.

Terminologies used herein are to mention only a specific exemplary embodiment, and does not limit the present invention. Singular forms used herein include plural forms as long as phrases do not clearly indicate an opposite meaning. A term "including" used in the present specification concretely indicates specific properties, zones, integer numbers, steps, operations, elements, and/or components, and is not to exclude presence or addition of other specific properties, zones, integer numbers, steps, operations, elements and/or components.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present invention so as to be easily practiced by a person skilled in the art to which the present invention pertains will be described in detail with reference to the accompanying drawings. However, the present disclosure may be modified in various different ways and is not limited to embodiments provided in the present description.

The vehicle power control device and method according to the embodiment of the present invention may have a limitation in reducing the size due to the non-resonant structure but may perform the voltage control using the bidirectional buck-boost converter with the simple voltage control. Further, the vehicle power control device and method uses the LLC resonant converter that may be reduced in size due to the resonant structure but has a difficulty in technically performing the voltage control, thereby increasing the electric capacity. As described above, it is possible to reduce the size and manufacturing cost of the power control system for capacity by connecting the buck-boost converter with the plurality of LLC resonant converters in parallel.

FIG. 1 is a diagram illustrating a vehicle power control device according to an embodiment of the present invention and FIG. 2 is a view illustrating a parallel connection structure of a bidirectional buck-boost converter and an LLC resonant converter illustrated in FIG. 1.

Referring to FIGS. 1 and 2, a vehicle power control device 100 may include a power source 110, a bidirectional buck-boost converter (closed loop buck-boost converter) 120, an LLC resonant converter unit (open loop converter) 130, and a controller 140. In the present invention, a bidirectional buck-boost converter 120 is applied as an example of a closed loop buck-boost converter. The LLC resonant converter unit 130 includes a plurality of LLC resonant converters 132 and 134. In the present invention, an LLC resonant converter is used as an example of an open loop converter.

In the embodiment of the present invention, the bidirectional buck-boost converter 120 is applied as an example of a closed loop buck-boost converter. Further, the LLC resonant converter unit 130 includes a plurality of LLC resonant converters 132 and 134. In the embodiment of the present invention, the LLC resonant converter is used as an example of the open loop converter.

One bidirectional buck-boost converter 120 and the plurality of LLC resonant converters 132 and 134 are connected in parallel. A power source 110 may supply power to one bidirectional buck-boost converter 120 and the plurality of LLC resonant converters 132 and 134. The controller 140 may control capacity of power output from the bidirectional buck-boost 120 and capacity of power output from the LLC resonant converter unit 130. Each of the LLC resonant converters 132 and 134 constituting the LLC resonant converter unit 130 may output power having predetermined capacity (i.e., a constant output). The controller 140 may control the bidirectional buck-bust converter 120 using a low speed switching frequency and may control the LLC resonant converters 132 and 134 using a high speed switching frequency. Further, the controller 140 may measure the power capacity required for a load 150 and may compare power applied to the load 150 with the power capacity required for the load 150 to control the output of the bidirectional buck-boost converter 120 and the output of the plurality of resonant converters 132 and 134.

The number of LLC resonant converters 132 and 134 that are in parallel connected to one bidirectional buck-boost converter 120 is not so restricted, and therefore the number of LLC resonant converters 132 and 134 may be increased to two, three, four, etc. to increase the capacity of the power system. The LLC resonant converters 132 and 134 may not control the output power capacity but the size of the LLC resonant converters 132 and 134 is small and the bidirectional buck-boost converter 120 may control the output power capacity but the bidirectional buck-boost converter 120 is relatively larger. Therefore, the size of the power control device may be reduced by connecting the bidirectional buck-boost converter 120 and the LLC resonant converters 132 and 134 in parallel and the power applied to the load 150 may be easily controlled by controlling the output of the bidirectional buck-boost converter 120 and the number of LLC resonant converters 132 and 134 that are operating. That is, the number of the LLC resonant converters 132 and 134 is determined in consideration of the capacity of the load 150 to implement the optimal power design, such that the size, weight, volume, and manufacturing cost of the power system may be reduced.

The vehicle power control device 100 may selectively operate one bidirectional buck-boost converter 120 and the plurality of LLC resonant converters 132 and 134 depending on the capacity of the load 150.

Unlike the above-described example, the bidirectional buck-boost converter 120 may also be provided in plural. In this case, the controller 140 may control the output of the plurality of bidirectional buck-boost converter 120 in consideration of the constant power of at least one of the LLC resonant converters 132 and 134.

FIG. 3 is a view illustrating a vehicle power control method according to an embodiment of the present invention, which illustrates a power control method for driving one LLC resonant converter before output capacity reaches an operating point.

Referring to FIG. 3, the controller 140 checks an operating point of the capacity of the load 150, and may always operate one LLC resonant converter 132 before the capacity of the load 150 reaches the operating point. Further, power is supplied from one LLC resonant converter 132 to the load 150. The controller 140 operates the bidirectional buck-boost converter 120 in a boost mode to supply the exceeding output capacity to the power source 110, thereby charging the power source 110.

For example, if the power capacity required for the load 150 is equal to the output capacity required for one LLC resonant converter 132, the controller 140 may not operate the bidirectional buck-boost converter 120.

As another example, if the power capacity required for the load 150 exceeds the output capacity required for one LLC resonant converter 132, controller 140 may further operate the bidirectional buck-boot converter 120 to provide power capacity corresponding to a difference between the power capacity required for the load 150 and the output capacity required for one LLC resonant converter 132.

Here, when the bidirectional buck-boost converter 120 is operated in the boost mode, the bidirectional buck-boost converter 120 may cause some power loss while passing through two stages. However, since the output efficiency of the bidirectional buck-boost converter 120 is 95% or more, the amount of power loss is insignificant. In addition, since the time to reach the operating point of the load 150 is short, the power loss due to the boost mode operation of the bidirectional buck-boost converter 120 is negligible.

FIG. 4 is a view illustrating a vehicle power control method according to an embodiment of the present invention, which illustrates a power control method for driving a plurality of LLC resonant converters before the output capacity reaches the operating point.

Referring to FIG. 4, the controller 140 may always operate one LLC resonant converter 132. The controller 140 confirms whether the power capacity required for the load 150 exceeds the output capacity by the driving of the bidirectional buck-boost converter 120 and one LLC resonant converter 132.

As the confirmation result, if it is determined that the power capacity required for the load 150 exceeds the output capacity of the bidirectional buck-boost converter 120 and one LLC resonant converter, the controller additionally operates the LLC resonant converter 134 besides the one LLC resonant converter 132 that is already operating. By doing so, the controller 140 operates the plurality of LLC resonant converters 132 and 134 to maintain the rated output. That is, if the output power reaches the operating point by the operations of the bidirectional buck-boost converter 120 and the plurality of LLC resonant converters 132 and 134, the plurality of LLC resonant converters 132 and 134 maintain the rated output. Further, the controller 140 operates the bidirectional buck-boost converter 120 in a boost mode to supply the exceeding output capacity to the power source 110, thereby charging the power source 110.

Here, depending on the power capacity required for the load 150, two LLC resonant converters, three LLC resonant converters, or four or more LLC resonant converters may be simultaneously driven to maintain the rated capacity.

FIG. 5 is a view illustrating a vehicle power control method according to an embodiment of the present invention, which illustrates a power control method upon an overload operation after the output capacity reaches the operating point.

Referring to FIG. 5, the controller 140 may always operate one LLC resonant converter 132. If the output power reaches the operating point by the operations of the bidirectional buck-boost converter 120 and the plurality of LLC resonant converters 132 and 134, the plurality of LLC resonant converters 132 and 134 maintain the rated output.

Then, the controller 140 checks whether a load larger than that at the operating point is applied. That is, if the capacity required for the load 150 is larger than that at the operating point, the bidirectional buck-boost converter 120 is operated in a buck mode, such that the overall power output of the bidirectional buck-boost converter 120 and the plurality of LLC resonant converters 132 and 134 is maintained to be the rated power. That is, when an overload is applied at the operating point, the power capacity corresponding to the difference between the power capacity required for the load 150 and the constant output provided by the plurality of LLC resonant converters 132 and 134 may be compensated by operating the bidirectional buck-boost converter 120 in the buck mode. The rated output is maintained by outputting power of insufficient power capacity through the bidirectional buck-boost converter 120.

The vehicle power control device and method according to the embodiment of the present invention may have a limitation in reducing the size due to the non-resonant structure but may perform the voltage control using the bidirectional buck-boost converter with the simple voltage control. Further, the vehicle power control device and method uses the LLC resonant converter that may be reduced in size due to the resonant structure but has a difficulty in technically performing the voltage control, thereby increasing the electric capacity. As described above, it is possible to reduce the size and manufacturing cost of the power control system for capacity by connecting the buck-boost converter with the plurality of LLC resonant converters in parallel.

The vehicle power control device and method according to the embodiment of the present invention may maintain the rated output by driving one bidirectional buck-boost 120 and one LLC resonant converter 132 but when the power capacity required for loads is insufficient, may maintain the rated output by additionally driving one or a plurality of LCC resonant converters 132 and 134.

The vehicle power control device 100 according to the embodiment of the present invention operates the bidirectional buck-boost converter 120 in the boost mode if the power capacity exceeds when the plurality of LLC resonant converters 132 and 134 are operated to absorb the exceeding power capacity, thereby maintaining the rated output.

FIG. 6 is a view illustrating a vehicle power control method according to another embodiment of the present invention, which illustrates a power control method for driving only a bidirectional buck-boost converter before output capacity reaches an operating point.

Referring to FIG. 6, the controller 140 checks the operating point of the capacity of the load 150, and may always operate the bidirectional buck-boost converter 120 before the capacity of the load 150 reaches the operating point. That is, if the controller 140 may satisfy the power capacity required for the load 150 by only the bidirectional buck-boost converter 120, the controller 140 operates the bidirectional buck-boost converter 120 in the buck mode to supply power to the load 150. At this point, the controller 140 may control the LLC resonant converter unit 130 not to operate.

FIG. 7 is a view illustrating a vehicle power control method according to an embodiment of the present invention, which illustrates a power control method for driving a bidirectional buck-boost converter and at least one LLC resonant converter.

Referring to FIG. 7, the controller 140 may always operate the bidirectional buck-boost converter 120 before or after the capacity of the load 150 reaches the operating point. If the power capacity required for the load 150 exceeds the power capacity that the bidirectional buck-boost converter 120 may output, the controller 140 may additionally operate at least one LLC resonant converter 132. That is, the bidirectional buck-boost converter 120 may provide power capacity as much as the power capacity (i.e., constant output) output from one LLC resonant converter 132 is smaller than that required for the load 150. The controller 140 may determine the power capacity required for the load 150 and the power capacity that the currently operating bidirectional buck boost converter 120 and at least one of the LLC resonant converters 132 and 134 may output, thereby controlling the bidirectional buck-boost converter 120 and at least one of the LLC resonant converters 132 and 134.

In addition, if the power capacity required for the load 150 is greater than the sum of the output of the bidirectional buck-boost converter 120 and the constant output of one LLC resonant converter 132, the controller 140 may additionally include one LLC resonant converter 134.

That is, the controller 140 may operate the bidirectional buck-boost converter 120 and the LLC resonant converter 132, and the controller 140 may control the bidirectional buck-boost converter 120 to output power capacity as much as the power capacity output from one resonant converter 132 is smaller than that required for the load 150. Further, if the output capacity output from the plurality of LLC resonant converters 132 and 134 is smaller than that required for the load 150, the controller 140 may control the bidirectional buck-boost converter 120 to output the power capacity corresponding to the insufficient power capacity, thereby maintaining the rated output of the vehicle power control device 200. In addition, when the output capacities output from the plurality of LLC resonant converters 132 and 134 and the bidirectional buck-boost converter 120 are smaller than that required for the load 150, the controller 140 may control the additional LLC resonant converter. When the bidirectional buck-boost converter 120 is always operated, the controller 140 may control the output of the bidirectional buck-boost converter 120 and the number of LLC resonant converters 132 and 134 that are operating, thereby maintaining the rated output of the vehicle power control device 200.

Unlike the foregoing example, when the output capacity output from one LLC resonant converter 132 is larger than that required for the load 150, the controller 140 operates the bidirectional buck-boost converter 120 in the boost mode, thereby maintaining the rated output. In this case, the bidirectional buck-boost converter 120 may supply the power capacity corresponding to the difference between the power capacity required for the load 150 and the output capacity from the LLC resonant converter 132 to the power source 110.

The vehicle power control device 200 according to the embodiment of the present invention may drive at least one of the LLC resonant converters 132 and 134 in the state in which one bidirectional buck-boost converter 120 is always operated, thereby maintaining the rated output and additionally drive one or a plurality of LLC resonant converters when the power capacity required for the load is insufficient, thereby maintaining the rated output.

FIG. 8 is a graph for explaining a method for controlling a vehicle power control device in each interval depending on power capacity required for a variable load. A description of overlapping contents is omitted for the simplicity of explanation. An x axis represents time and a y axis represents power required for a load.

Referring to FIG. 8, the power required for the variable load varies in each interval. As the power varies, the controller may control the bidirectional buck-boost converter and at least one LLC resonant converter.

As illustrated in FIGS. 3 to 5, the power required for the load 150 in an interval (first interval) from 0 to t1 on the x axis may vary from 0 to P1. In this case, the power capacity output from one LLC resonant converter 132 is defined as $P_L$, a maximum value of the power capacity that the bidirectional buck-boost converter 120 may output is defined as Pc, and the power required for the load 150 is defined as $P_O$. The controller 140 always maintains one LLC resonant converter 132 in an operating state, and therefore may control the output of the bidirectional buck-boost converter 120 in the first interval, thereby maintaining the rated output of the vehicle power control device 100. In detail, if the power required for the load 150 is smaller than the constant output of one LLC resonant converter 132 ($P_L > P_0$), the controller 140 may operate the bidirectional buck-boost converter 120 in the boost mode. If the power required for the load 150 is larger than the constant output of one LLC resonant converter 132 ($P_L < P_0$), the controller 140 may operate the bidirectional buck-boost converter 120 in the buck mode.

The power required for the load 150 in an interval (second interval) from time t1 to time t2 on the x-axis may vary from P1 to P2. If the power required for the load 150 is larger than the constant output of one LLC resonant converter 132 ($P_L < P_0$), the controller 140 may operate the bidirectional buck-boost converter 120 in the buck mode. Further, if the power required for the load 150 is greater than the sum of the constant output of one LLC resonant converter 132 and the output capacity of bidirectional buck-boost converter 120 ($P_0 > P_L + Pc$), the controller 140 may additionally operate one LLC resonant converter 134. In this case, if the power required for the load 150 is smaller than the constant output of the two LLC resonant converters 132 and 134 ($2P_L > P_0$), the controller 140 may operate the bidirectional buck-boost converter 120 in the boost mode. In this case, if the power required for the load 150 is greater than the constant output of the two LLC resonant converters 132 and 134 ($2P_L < P_0$), the controller 140 may operate the bidirectional buck-boost converter 120 in the buck mode.

Even in an interval (third interval) from t2 to t3 and other intervals, the controller 140 may determine the power capacity required for the load 150 and control the output of the bidirectional buck-boost converter 120 and the number of LLC resonant converters 132 and 134 that are operating, thereby maintaining the rated output of the vehicle power control device 100.

In the case of FIGS. 6 and 7, the controller 140 always maintains the bidirectional buck-boost converter 120 in an operating state. If the power capacity required for the load 150 in the first interval is smaller than the power capacity that the bidirectional buck-boost converter 120 may output ($Pc > P_0$), the controller 140 controls the output of the bidirectional buck-boost converter 120, thereby maintaining the rated output of the vehicle power control device 200. That is, the controller may not operate the separate LLC resonant converters 132 and 134. If the power capacity required for the load 150 is larger than the power capacity that the bidirectional buck-boost converter 120 may output ($Pc < P_0$), the controller 140 operates one LLC resonant converter 132. In this case, the controller 140 may control the bidirectional buck-boost converter 120 to output the power capacity corresponding to the difference between the output capacity of the LLC resonant converter 132 and the power capacity required for the load 150 ($Pc = P_0 - PL$).

Even other intervals, the controller 140 always operates the bidirectional buck-boost converter 120, and may determine the power capacity required for the load 150 to control the output of the bidirectional buck-boost converter 120 and the number of LLC resonant converters 132 and 134 that are operating, thereby maintaining the rated output of the vehicle power control device 100.

In conclusion, when the power required for the load 150 exceeds the power capacity output from one LLC resonant converter 132, the controller 140 needs to simultaneously operate at least one of the LLC resonant converters 132 and 134 and the bidirectional buck-boost converter 120. However, if the power required for the load 150 does not exceed the power capacity output from one LLC resonant converter 132, the difference between the control method according to the embodiment illustrated in FIGS. 3 to 5 and the control method according to another embodiment illustrated in FIGS. 6 and 7 is shown.

In addition to the foregoing examples, the controller 140 compares the power capacity output from the bidirectional buck-boost converter 120 and the plurality of LLC resonance converters 132 and 134 with the power capacity required for the load 150 to combine the bidirectional buck-boost converter 120 with the plurality of LLC resonant converters 132 and 134, thereby maintaining the rated output of the vehicle power control device.

Those skilled in the art will appreciate that since various modifications and alterations may be made without departing from the spirit or essential feature of the present invention, the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A vehicle power control device, comprising:
a closed loop buck-boost converter supplied with power from a power source and outputting the power to a load;
at least one open loop converter connected to the closed loop buck-boost converter in parallel and supplied with the power from the power source and outputting the power to the load; and
a controller controlling an operation of the closed loop buck-boost converter and an operation of the at least one open loop converter, respectively, depending on power capacity required for the load,
wherein the controller controls the closed loop buck-boost converter to be maintained in an operating state.

2. The vehicle power control device of claim 1, wherein the controller determines output capacity of the closed loop buck-boost converter and operates the open loop converter if the output capacity of the closed loop buck-boost converter is smaller than the power capacity required for the load.

3. The vehicle power control device of claim 2, wherein the controller controls the closed loop buck-boost converter so that the closed loop buck-boost converter outputs power as much as a constant output of the open loop converter is smaller than that required for the load.

4. The vehicle power control device of claim 2, wherein if the power capacity required for the load is greater than a sum of an output of the closed loop buck-boost converter and a constant output of the open loop converter, the controller additionally operates the at least one open loop converter.

5. The vehicle power control device of claim 1, wherein the controller operates the closed loop buck-boost converter and the at least one open loop converter and controls the output of the closed loop buck-boost converter as much as the output capacity of the at least one open loop converter is smaller than the power capacity required for the load.

6. The vehicle power control device of claim 1, wherein the controller operates the closed loop buck-boost converter and the at least one open loop converter and operates the closed loop buck-boost converter in a boost mode if the output capacity of the at least one open loop converter is greater than the power capacity required for the load.

7. A vehicle power control device, comprising:
a closed loop buck-boost converter supplied with power from a power source and outputting the power to a load;
at least one open loop converter connected to the closed loop buck-boost converter in parallel and supplied with the power from the power source and outputting the power to the load; and
a controller controlling an operation of the closed loop buck-boost converter and an operation of the at least one open loop converter, respectively, depending on power capacity required for the load,
wherein the controller controls the at least one open loop converter to be maintained in an operating state.

8. The vehicle power control device of claim 7, wherein the controller determines output capacity of the at least one open loop converter and operates the closed loop buck-boost converter in a buck mode if the output capacity of the at least one open loop converter is smaller than the power capacity required for the load.

9. The vehicle power control device of claim 8, wherein the controller determines output capacity of the closed loop buck-boost converter and the output capacity of the at least one open loop converter and additionally operates the open loop converter if a sum of the output capacity of the closed loop buck-boost converter and the output capacity of the at least one open loop converter is smaller than the power capacity required for the load.

10. The vehicle power control device of claim 9, wherein the controller determines the output capacity of the plurality of open loop converters and operates the closed loop buck-boost converter in the buck mode if the output capacity of the plurality of open loop converters is smaller than the capacity required for the load.

11. The vehicle power control device of claim 9, wherein the controller determines the output capacity of the plurality of open loop converters and operates the closed loop buck-boost converter in a boost mode if the output capacity of the plurality of open loop converters exceeds the capacity required for the load.

12. The vehicle power control device of claim 7, wherein the closed loop buck-boost converter is operated in the boost mode to charge the power source with power remaining after consumed by the load.

13. A vehicle power control device, comprising:
a closed loop buck-boost converter supplied with power from a power source and outputting the power to a load;
at least one open loop converter connected to the closed loop buck-boost converter in parallel and supplied with the power from the power source and outputting the power to the load; and
a controller controlling an operation of the closed loop buck-boost converter and an operation of the at least one open loop converter, respectively, depending on power capacity required for the load.

14. The vehicle power control device of claim 13, wherein the controller determines output capacity of the closed loop buck-boost converter and the plurality of open loop converters and operates the closed loop buck-boost converter in a buck mode if the output capacity is smaller than the power capacity required for the load.

15. The vehicle power control device of claim 13, wherein the controller determines output capacity of the closed loop buck-boost converter and the plurality of open loop converters and additionally operates one or a plurality of open loop converters in addition to the open loop buck-boost converter that is operating, if the output capacity is smaller than the power capacity required for the load.

16. The vehicle power control device of claim 13, wherein the controller determines output capacity of the closed loop buck-boost converter and the plurality of open loop converters and operates the closed loop buck-boost converter in a boost mode if the output capacity exceeds the power capacity required for the load.

17. The vehicle power control device of claim 13, wherein the closed loop buck-boost converter charges the power source with power remaining after consumed by the load.

18. The vehicle power control device of claim 13, wherein a bidirectional buck-boost converter is applied as the closed loop buck-boost converter.

19. The vehicle power control device of claim 13, wherein an LLC resonant converter is applied as the open loop converter.

* * * * *